United States Patent Office 3,511,467
Patented May 12, 1970

3,511,467
APPARATUS FOR THE PRODUCTION OF SLAB-SHAPED CONSTRUCTION ELEMENTS FROM POURABLE OR CASTABLE MATERIALS
Otto Rohrer, Brunnmattstrasse 85,
Bern, Switzerland
Filed May 24, 1967, Ser. No. 640,955
Claims priority, application Switzerland, May 31, 1966, 7,821/66
Int. Cl. B28b 7/04, 7/24
U.S. Cl. 249—118                    10 Claims

ABSTRACT OF THE DISCLOSURE

An apparatus for the production of substantially slab- or plate-shaped construction elements formed of castable materials which comprises at least two oppositely situated, substantially parallel form boards or plates which are movable relative to one another in order to be able to vary the thickness of the element to be produced. Further, at least one pivotable guide means serves to interconnect at each side or end the aforementioned form boards, and actuating means cooperate with the aforesaid guide means for imparting to at least one of such form boards a movement in the plane thereof.

BACKGROUND OF THE INVENTION

The present invention pertains to an improved apparatus for the production of substantially slab-shaped or plate-shaped construction elements formed of pourable or castable materials and is of the type incorporating at least two oppositely situated, substantially parallel form boards or the like which are movable relative to one another in order to be able to vary the thickness of the element which is to be produced.

Apparatuses are already known to the art which are composed of form plates or boards erected in series behind one another in order to manufacture plate- or slab-shaped construction elements. However, these prior art constructions possess the drawback that the displacement of the form plates and their connection with one another in all of such prior art structures was very complicated and time consuming.

SUMMARY OF THE INVENTION

Accordingly, it is a primary object of the present invention to provide an improved apparatus of the aforementioned type which effectively overcomes the previous drawbacks of the prior art structures explained above.

Another, more specific object of this invention relates to an improved apparatus for the production of slab-shaped construction elements formed of castable or pourable materials, typically concrete, which is extremely simple in construction, highly reliable and economical in operation, and permits production of the aforementioned elements in an extremely efficient manner and allows for changing the desired thickness thereof quite simply so that different size elements can be produced with the same apparatus.

Still a further noteworthy object of the present invention relates to an improved apparatus for producing substantially slab-like elements in an extremely economical fashion wherein it is possible to selectively vary the thickness of the element to be manufactured, and where stripping of the produced element after the casting operation can be achieved quite simply and quickly.

Now, in order to implement these and still further objects of the invention which will become more readily apparent as the description proceeds, and further, to expressly overcome the aforementioned drawbacks of the prior art structures, the inventive apparatus contemplates providing at least one pivotable guide means for interconnecting at both sides the form plates or boards, and further, incorporates actuating means for imparting to at least one of the form boards a movement in its plane.

BRIEF DESCRIPTION OF THE DRAWINGS

The invention will be better understood, and objects other than those set forth above, will become apparent, when consideration is given to the following detailed description thereof. Such description makes reference to the annexed drawings wherein.

DESCRIPTION OF THE PREFERRED EMBODIMENT

Figure 1:
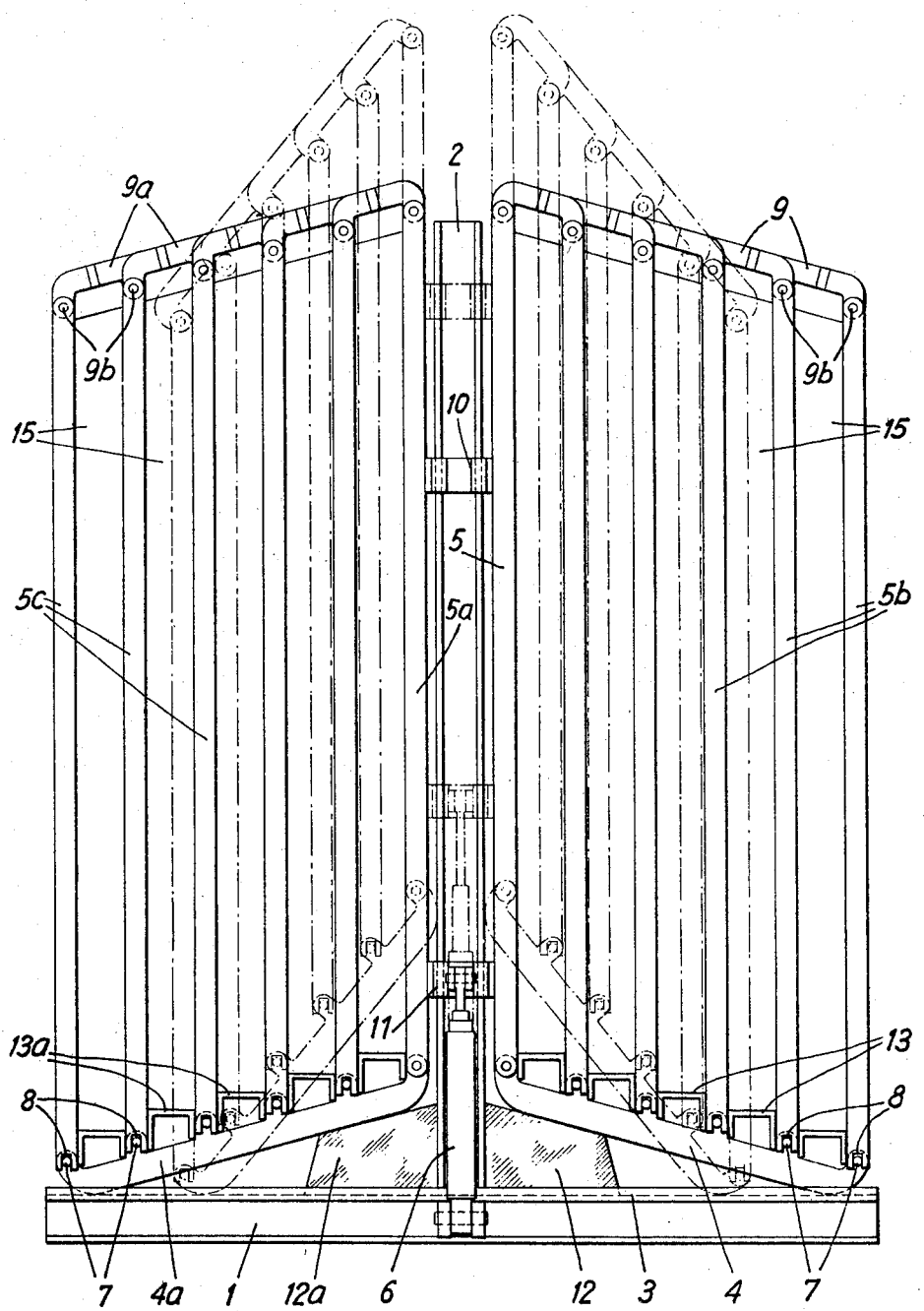
FIG. 1 schematically illustrates a front end view of a preferred embodiment of the inventive apparatus in the casting or filling position, and further, depicting in phantom lines the variable spacing between the form boards or plates after appropriate pivotable movement of the guide means.

With reference now to the drawings it will be seen that the exemplary illustrated apparatus comprises a support or carrier frame 1 to which there are secured the support columns 2 and 2a serving as guide rail means as well as the guide rails 3 and 3a. Connection supports or guide means 4 and 4a bear upon the guide rails 3 and 3a. It should be understood that when the guide means 4 and 4a are pivoted by means of the suitable hydraulic actuating elements or means 6 arranged at the two outer support columns 2 and substantially parallel to the plane of the form plates or boards 5 and 5a, such guide means 4 and 4a slide upon the associated guide rails 3 and 3a.

By further referring to FIG. 1, it will be seen that the lower edges of the form boards or plates 5, 5a, 5b and 5c are hingedly connected at their bottom region at both sides or ends thereof with the continuous pivotable guide means 4 and 4a, in other words are maintained at the same spacing from one another, by the bolts or support members 7 provided at the guide means 4, 4a, and further, by means of the downwardly open bolt guides 8 provided at the aforementioned form plates or boards. Additionally, these form boards, 5 5a, 5b and 5c are hingedly connected at the top region thereof with the removable and exchangeable connection pieces 9 and 9a by means of their bolts 9b or equivalent structure.

Further, the guide elements 10 and the lifting- and lowering ram or piston guide 11 of the hydraulic actuating means 6 are secured to both of the inner form boards 5 and 5a in order to transmit the desired movement to the continuous guide means 4 and 4a so as to bring about a synchronous or parallel associated movement of the remaining hingedly connected form boards or plates 5b and 5c. Further, it will be understood that both of the reinforcements or stiffening members 12 and 12a simultaneously serve as limit supports.

Figure 2:
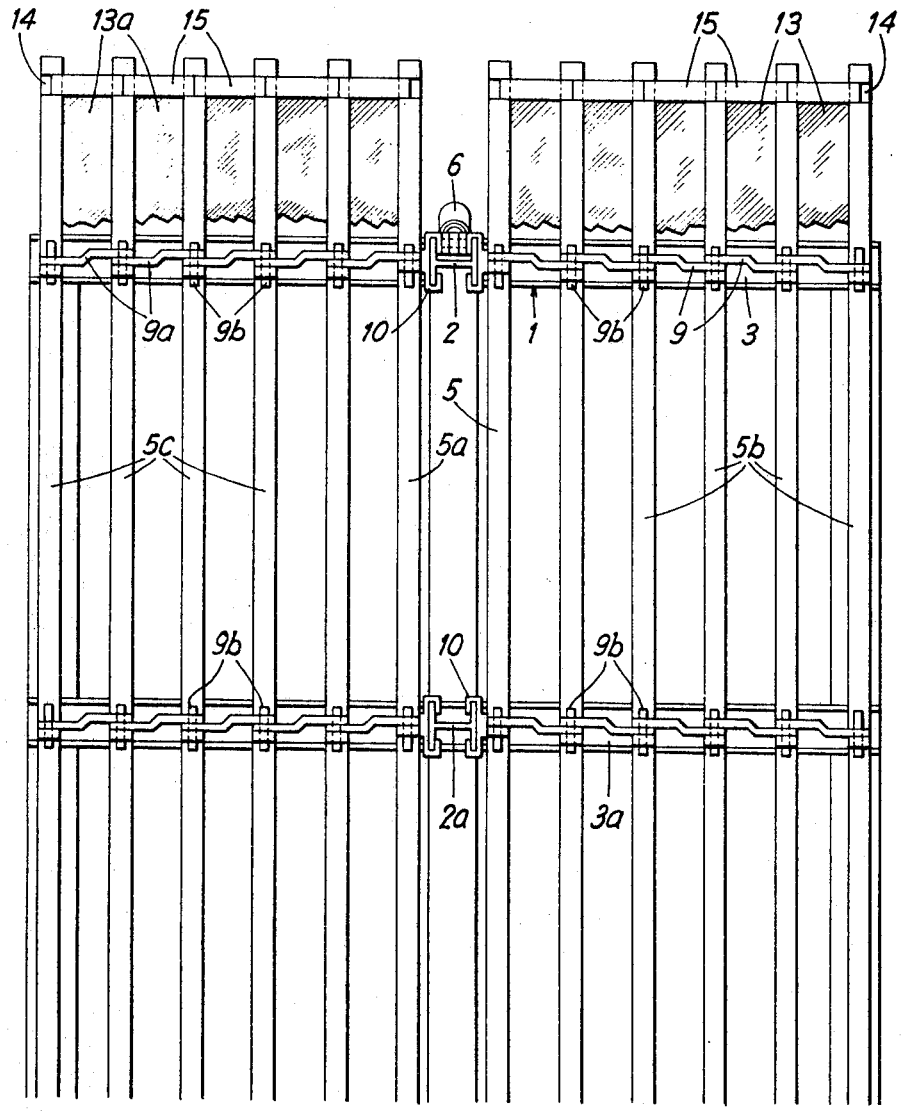
FIG. 2 is a top plan view of the apparatus depicted in FIG. 1, wherein the form boards are depicted in a position wherein they have the largest possible spacing from one another.

In FIG. 2 there is shown the fragmentary boundary pallets or bottom form members 13 and 13a and the lateral boundary elements or side form members 15 inserted in the recesses or grooves 14 and which serve to seal the pouring or filling chamber towards the bottom and laterally respectively.

Having now had an opportunity to consider the structure of the exemplary depicted apparatus the operation thereof will next be considered, and is as follows: Initially, the desired spacing of the, for instance, vertically disposed form boards or plates 5, 5a, 5b and 5c with regard to one another is adjusted by means of the hydraulic actuating means 6 arranged substantially parallel to the plane of the form boards 5 and 5a. This adjustment is, of course, made after mounting of the upper connection pieces 9, 9a and the previous installation of any desired reinforcement elements, any desired recess templets for forming door- or window openings, or after mounting of any other necessary or desired elements. Further, it should be apparent that such adjustment of the mutual spacing of the form boards 5, 5a, 5b, and 5c from one another is undertaken with respect to the desired thickness or strength of the slab- or plate-shaped individual concrete elements which are to be manufactured (see the phantom line showing of FIG. 1). After mounting of the proper size boundary pallets 13, 13a and the lateral boundary form elements 15, as well as any possibly required separation elements, there is next begun the casting or pouring of the concrete slab or plate. The pouring of the concrete slab is undertaken, depending upon requirements, with intermediate vibration by means of a vibrator which is submerged in the poured material or fixedly mounted in the apparatus.

After hardening of the concrete elements, and with enlargement of the mutual spacing between the form boards or members 5, 5a, 5b and 5c by lowering the above described articulated system composed of the guide means, form members and upper connection elements, a crane or other suitable lifting device step-wise successively removes the form boards and concrete elements from the outside towards the inside and after first demounting the upper connection elements.

Thereafter, these form boards 5, 5a, 5b and 5c are again mounted, in other words are again placed in the desired position with respect to one another by pushing the bolt guides 8 onto the bolts or support members 7. Now, all of the upper connection elements 9, 9a are again appropriately secured, all boundary form elements, as well as any inserts and reinforcements are applied, so as to be able to again begin with the casting and filling of the form assembly with intermediate vibration as previously explained.

Furthermore, it should be apparent that it would be possible to also dispense with some of the intermediate individual form boards or plates, and in lieu thereof to mount wider pallets or bottom form members, side form members and upper connection elements in order to be able to manufacture, with the same apparatus, twice as thick individual components. Likewise, a plurality of bolts or support members 7 could be mounted at the guide means so that after appropriate engagement of the form boards or plates there results a desired thickness or strength of the concrete slabs.

While there is shown and described a present preferred embodiment of the invention, it is to be distinctly understood that the invention is not limited thereto but may be otherwise variously embodied and practiced within the scope of the following claims.

Accordingly, what is claimed is:

1. In apparatus for producing plate-like building elements of castable material, a plurality of form members arranged in essentially vertical relation and defining a molding space between adjacent members, at least one pair of spaced parallelogram guide means spaced apart a distance at least approximating the vertical extent of said form members, means pivotally connecting the opposite ends of said form members to said guide means so that the respective guide means and form members remain in parallelism, and means for displacing the interconnected guide means and form members in parallelism to move said form members in the direction of the vertical extent of said form members to and from a casting position in which the space between adjacent form members corresponds to the desired thickness of the plate-like building element to be cast to a removal position where the space between adjacent form members is greater than such desired thickness so as to facilitate removal of cast building elements.

2. Apparatus as claimed in claim 1 and one of said guide means constituting a lower guide means and bottom form members removably supported on said lower guide means between adjacent form members.

3. Apparatus as claimed in claim 2 and said other guide means comprising a plurality of individual detachably interconnected link members.

4. Apparatus as claimed in claim 1 and there being at least three form members for casting at least two building elements, said spaced parallelogram guide means comprising upper and lower guide means, the means pivotally connecting the opposite ends of said form members to said guide means comprising for at least the intermediate one of said form members detachable pivot connections whereby said intermediate one of said form members can be removed when it is desired to produce a thicker building element.

5. Apparatus as claimed in claim 4 and horizontal guide surface means, said lower parallelogram guide means comprising bar means, one end of said bar means slidably engaging said horizontal guide surface means, the means pivotally connecting the opposite ends of said form members to said parallelogram guide means, further including a pivot connection between the other end of said bar means and the lower end of said form member remote from the end of said bar means that slidably engages said horizontal guide surface means.

6. Apparatus as claimed in claim 5 and the means for displacing said interconnected guide means and form members being operably connected to said last-mentioned form member to displace said last-mentioned form member within its plane when said interconnected guide means and form members are displaced.

7. Apparatus as claimed in claim 5 and bottom form members having a width corresponding to the space between adjacent form members when the same are in an upper casting position removably supported on said bar means.

8. Apparatus as claimed in claim 7 and side form members having a width corresponding to the space between adjacent form members when the same are in an upper casting position removably supported on said form members.

9. Apparatus as claimed in claim 1 and said spaced parallelogram guide means comprising upper and lower parallelogram guide means, said lower parallelogram guide means comprising bar means, one end of said bar means slidably engaging said horizontal guide surface means, the means pivotally connecting the opposite ends of said form members to said parallelogram guide means further including a pivot connection between the other end of said bar means and the lower end of said form member remote from the end of said bar means that slidably engages said horizontal guide surface means.

10. Apparatus as claimed in claim 9 and said upper parallelogram guide means, said bar means, and said horizontal guide surface means comprising at least a pair of each said means spaced transversely of the vertical extent of said form members.

References Cited

UNITED STATES PATENTS

| | | |
|---|---|---|
| 699,625 | 5/1902 | Lancaster. |
| 777,633 | 12/1904 | Hibbard. |
| 802,699 | 10/1905 | Lancaster. |
| 1,322,784 | 11/1919 | Greulock. |
| 1,619,749 | 3/1927 | Murray. |

FOREIGN PATENTS 933,837    8/1963    Great Britain.

J. HOWARD FLINT, Jr., Primary Examiner

U.S. Cl. X.R.

249—102, 155, 162